UNITED STATES PATENT OFFICE.

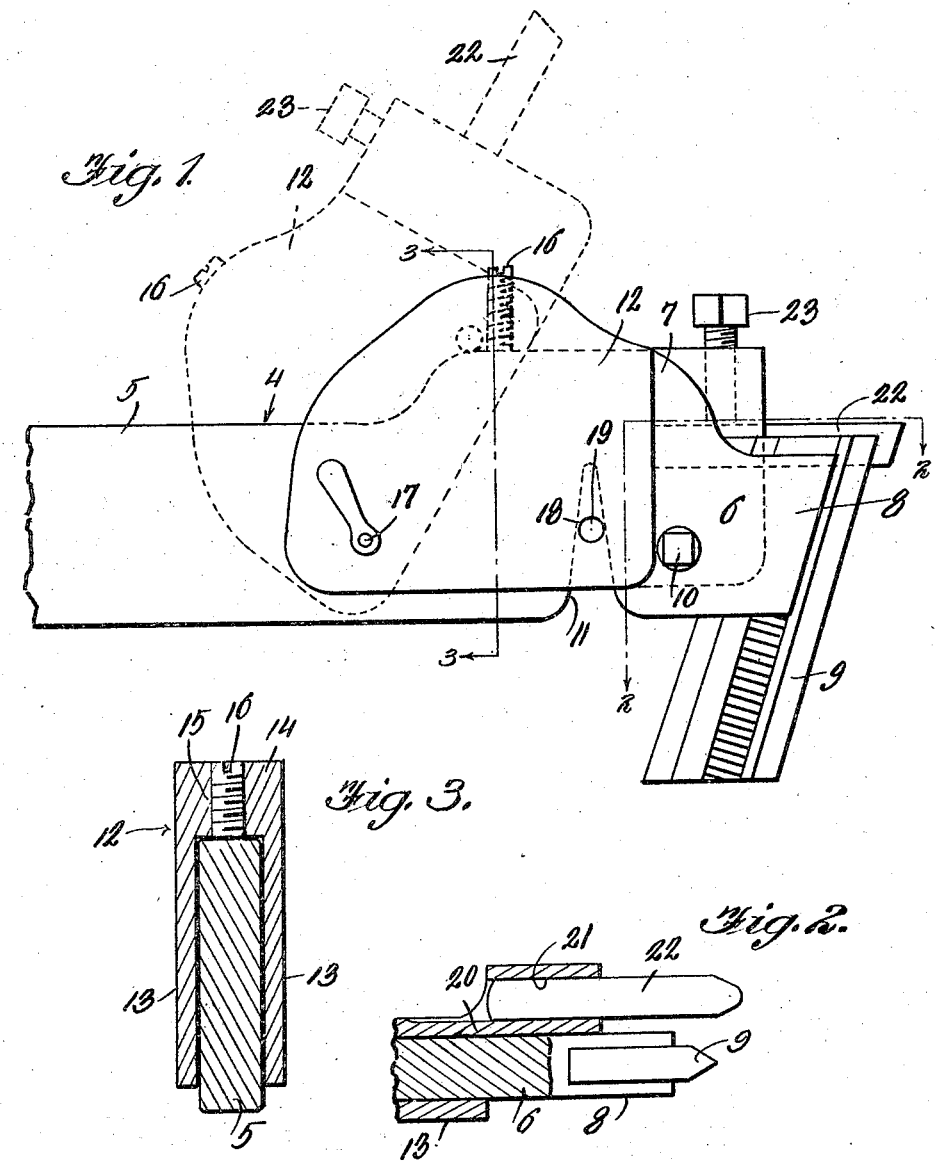

JOSEPH HENNING, OF NEWBURGH, NEW YORK.

ATTACHMENT FOR TOOL HOLDERS.

1,419,967.  Specification of Letters Patent.  Patented June 20, 1922.

Application filed December 15, 1920. Serial No. 430,905.

*To all whom it may concern:*

Be it known that I, JOSEPH HENNING, a citizen of the United States, residing at Newburgh, in the county of Orange and State of New York, have invented certain new and useful Improvements in Attachments for Tool Holders, of which the following is a specification.

This invention relates to new and useful improvements in tool holders, as for example those employed upon lathes for holding a plurality of tools or cutters, the primary object of the invention being to provide a holder including a complementary tool holder which may be moved relatively of the fixed tool holder whereby one tool may be used independently of the other without effecting adjustments of either tool.

Another important object of the invention is to provide a device of the above nature including retaining means for holding the complementary tool holder in operative position for retaining the tool associated therewith in an engagement with the work, or for retaining the complementary holder in an idle position so that the tool may be retained out of engagement with the work so as not to interfere with the operation of the tool mounted in the tool holder.

Another object of the invention is to provide a tool holder including a relatively movable complementary tool holding saddle and means whereby the position of the latter may be varied with respect to the former to effect angular adjustments of the saddle as well as to cooperate with the retaining means for the saddle for securely retaining the same in operative working position.

Other objects and advantages of the invention will become apparent during the course of the following description.

In the accompanying drawings forming a part of the application and wherein like numerals are employed to designate like parts throughout the several views, Figure 1 is a side elevation of a tool holder, embodying my invention.

Figure 2 is a transverse horizontal section taken on the line 2—2 of Figure 1.

Figure 3 is a vertical transverse section taken on the line 3—3 of Figure 1.

Referring to the drawings wherein for the purpose of illustration is shown the preferred embodiment of the invention, the numeral 4 designates in its entirety what is known to the trade as a William thread tool holder. This holder consists of a shank portion 5 which is adapted to be gripped by the tool post of a lathe. The upper edge of the shank's head 6 is provided with an upstanding raised portion or hump 7. The head of the holder is provided with the usual jaw portions 8 which are caused to grip and hold a thread cutting tool 9 through the medium of a machine screw 10 extending transversely through the jaw portions 8. The lower edge or bottom of the tool holder slightly in the rear of the jaw portion is provided with an inwardly or upwardly extending V-shaped slot 11 which extends transversely of the holder.

The complementary tool holder consists of saddle 12, of inverted U form the sides 13 of the saddle being adapted for engagement with opposite sides of the tool holder 4. The top or portion 14 which connnects the two arms 13 is adapted to engage and rest upon the top or top edge of the tool holder, as is clearly shown in Figure 1. The connecting portion 14 of the saddle is provided with a vertical threaded opening 15 in which is received a set screw 16, the lower end of which is adapted for engagements with the top of the hump or the raised portion 7 constituting a part of the tool holder 4. The saddle is pivotally connected at its rear end by a suitable pivot 17 extending transversely through the shank of the tool holder and the rear lower corners of the saddle sides 13. An opening 18 is provided transversely in each side of the saddle adjacent its forward end, and these openings are adapted to align with a portion of the slot 11 when the complementary tool holder or saddle is arranged in its operative position. A pin 19 is adapted to be passed transversely of the saddle through the openings 18 in order to maintain the same in either operative or inoperative position. When the saddle is maintained in the latter position, the pin 19 merely extends through the openings 18 and abuts the top of the raised portion 7 of the tool holder 4. However, when the saddle is disposed in an operative position so that its top 14 rests upon the raised portion of the tool holder, the pin 19 is adapted to extend through the slot 11 in the tool holder and engage the inclined sides of the slot to securely retain the saddle in position.

As best seen in Figure 2, one side of the saddle is extended forwardly of the tool holder to be arranged laterally of and in engagement with one side face of the holder 5. This extended portion 20 of the one side is provided with a socket 21 extending longitudinally of the tool holder and adapted to receive therein a tool or cutter 22. It is securely retained in the socket 21 through the medium of a machine screw 23 extending through a vertically disposed threaded opening in the extended portion 20 to abut the top of the tool 22.

From the foregoing description, it will be seen when the complementary tool holder or saddle is disposed in the position shown in Figure 1, that the tool 22 carried thereby is in a position to operate upon the work. It will also be seen that upward swinging movement of the saddle will be precluded by the pin 19 engaging the upwardly converging walls of the slot 11.

Downward swinging movement thereof will be prevented by either the top 14 of the saddle or the screw 16 engaging the raised portion 7 of the tool holder, depending upon the desired adjustment of the saddle. After the tool 22 has been used and the use of the saddle 12 is no longer desirable, the pin 19 is removed from the openings 18 after which the saddle is swung upwardly upon the pivot 17. This movement of the saddle causes similar movement of the socket 21 and consequently the cutter tool 22 whereby it does not in any way hinder the operation of the thread cutting tool 9. After the saddle has swung sufficiently to dispose of the openings 18 in the sides thereof above the raised portion 7, the pin 19 is inserted in the openings and when the saddle is again lowered, the pin abuts the raised portion 7 and prevents accidental downward swinging movement thereof.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims:

1. A tool holder having a V shaped slot, a complementary tool holder pivoted thereto and having an opening adapted for alinement for the slot at times, and a pin adapted to extend through the opening and the slot for retaining the complementary holder in an operative position.

2. A tool holder, a tool holding saddle having a portion adapted to rest upon the tool holder for supporting the saddle, and a screw carried by the saddle and adapted to engage the tool holder for adjusting the saddle.

3. A tool holder comprising in combination, a body portion adapted to hold a tool in longitudinal alinement therewith, a tool holding saddle pivotally associated with the body portion to be supported thereby, and a laterally disposed tool socket carried by the saddle and extending longitudinally beside the forward end of the body portion, whereby a pair of tools may be supported side by side.

4. A tool holder comprising a shank having a V-shaped slot, a complementary tool holder pivoted thereto and having an opening adapted for alinement with the slot at times, a pin adapted to extend through the opening and the slot for retaining the complementary holder in an operative position, and means carried by the complementary tool holder for causing the pin to wedge in said slot.

In testimony whereof I affix my signature in presence of two witnesses.

JOSEPH HENNING.

Witnesses:
JAS. J. THAUGEN,
BARSLOY VAN CLEFT.